United States Patent
Huang

(10) Patent No.: US 8,346,984 B2
(45) Date of Patent: Jan. 1, 2013

(54) APPARATUS AND METHOD FOR INTELLIGENT ANALYSIS OF DEVICE COMPATIBILITY AND ADAPTIVE PROCESSING OF MULTIMEDIA DATA

(76) Inventor: Jeffrey Huang, San Jose, CA (US)

( * ) Notice: Subject to any disclaimer, the term of this patent is extended or adjusted under 35 U.S.C. 154(b) by 596 days.

(21) Appl. No.: 12/435,416

(22) Filed: May 5, 2009

(65) Prior Publication Data

US 2010/0287312 A1    Nov. 11, 2010

(51) Int. Cl.
*G06F 3/00* (2006.01)
*G06F 5/00* (2006.01)
(52) U.S. Cl. .................. 710/8; 710/16; 710/29; 710/57
(58) Field of Classification Search ................ 710/8, 16, 710/29, 57
See application file for complete search history.

(56) References Cited

U.S. PATENT DOCUMENTS

| 2007/0074266 A1* | 3/2007 | Raveendran et al. | 725/135 |
| 2008/0016266 A1* | 1/2008 | Liu | 710/311 |

* cited by examiner

*Primary Examiner* — Chun-Kuan Lee
*Assistant Examiner* — Zachary K Huson
(74) *Attorney, Agent, or Firm* — Invent Capture, LLC.; Samuel S. Cho

(57) ABSTRACT

An apparatus and a method for intelligent analysis of device compatibility and adaptive processing of multimedia data are disclosed. By performing a unique intelligent analysis of device compatibility, the present invention provides a full application-level compatibility between the apparatus performing the intelligent analysis and an external device operatively connected to the apparatus even when device driver-level information of the external device is unavailable. Furthermore, a unique intelligent analysis for adaptive processing of multimedia data between the apparatus and the external devices enables an efficient and flexible usage of storage space in the external device for a multimedia data transfer from the apparatus to the external device.

8 Claims, 8 Drawing Sheets

300

| External Device\Characteristics | Compatible Data Sampling Rates | Multimedia Codec Type | Other Characteristics (e.g. ideal resolution) |
|---|---|---|---|
| Device A | EP, LP, SP | H.264, WMV, DivX | XGA |
| Device B | EP only | WMV | QVGA |
| Device C | EP, LP, SP | H.264 | SVGA |
| Device D | EP, LP | H.264, WMV, DivX | VGA |
| Default USB Storage | Assume EP | Assume WMV | VGA |

An example of LUT containing external device-specific characteristics

| Sampling Types\Sampling Rate | Mbits / second |
|---|---|
| SP | 2 |
| LP | 1 |
| EP | 0.5 |
| Adaptive Encoding Rate | Variable |

An example of multimedia data sampling types and sampling rates

APPARATUS AND METHOD FOR INTELLIGENT ANALYSIS OF DEVICE COMPATIBILITY AND ADAPTIVE PROCESSING OF MULTIMEDIA DATA

BACKGROUND OF THE INVENTION

The present invention generally relates to intelligent analysis of device compatibility and adaptive processing of multimedia data based on requirements and limitations of a connected device. More specifically, the invention relates to an apparatus and a method for intelligent analysis of device compatibility. Furthermore, the invention also relates to an apparatus and a method for intelligent analysis of multimedia data and electronic devices for optimal and error-free adaptive processing of the multimedia data transfer between electronic devices.

More emphasis are placed on today's new electronic devices to communicate seamlessly with other electronic devices. A cellular phone which was primarily used as a standalone voice-communication electronic device twenty years ago is now expected to be connected to a user's computer, a vehicle communication and audio system, and numerous kinds of portable electronics. In order to satisfy consumers' ever-increasing demand for device compatibilities, many consortiums of companies have formulated standardized wireless and wired communication protocols to provide an ease of communication compatibilities among a plurality of electronic devices. Bluetooth, IEEE 802.11-based wireless LAN protocols, and IEEE 1394 "FireWire" standards are current industry examples of standardized device level interfaces to provide device compatibilities.

The industry trend today is minimizing the burden of manual device configurations from users for more satisfying user experience. However, in most cases, a complete application-level compatibility requires at least one device to possess some driver-level information of a connecting device. In one conventional case, the driver-level information of a first device is already present (e.g. pre-installation, and etc.) in a second device before the first device is connected to the second device using a common standardized protocol. In another conventional case, the driver-level information of the first device is transferred to the second device during or after a hardware-level detection of an operative connection (e.g. physical wire connection, PHY-level wireless protocol connection, and etc.) between the first device and the second device. Some application-level initial device connections require manual configurations of device drivers, while others are automated upon physical-level connections.

Another example of the present limitation of providing user-friendly device compatibility is a well-known compatibility concept called "Plug-n-Play", which enables a peripheral device to be recognized by a PC when the peripheral device is plugged into a PC communication port (e.g. serial, parallel, EISA, PCI, and etc.). "Plug-n-Play" was largely popularized by Microsoft's Windows 95 operating system released in the mid-1990's. Although "Plug-n-Play" allows a computer user to plug-in a peripheral device for an auto-initialization of the peripheral device, it still requires a device driver to be either pre-installed in the PC or installed to the PC during the auto-initialization process. Therefore, in today's conventional methods of establishing compatible application-level connections, an electronic device which does not have or does not have access to driver-level information of a connecting device typically fails to provide a full application-level compatibility.

Therefore, it is highly advantageous to devise an apparatus and a method for intelligent analysis of device compatibility which enable a full application-level compatibility even without device driver-level information of a connecting device. Furthermore, it is also often advantageous to perform an intelligent analysis of multimedia data and electronic devices for optimal and error-free adaptive processing of the multimedia data transfer between electronic devices, typically after the intelligent analysis of device compatibility.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for conducting an intelligent analysis of device compatibility by an apparatus is disclosed. This method comprises the steps of detecting an operative connection of an external device to an I/O port of the apparatus capable of performing the intelligent analysis of device compatibility, executing or attempting to execute an I/O-specific protocol for tests, mounting, and/or signature file access from the apparatus to the external device, using a look-up table (LUT) containing external device-specific characteristics and conditional logic as an attempt to find a known file structure inside the external device, and if the known file structure is not found inside the external device: making an assumption that the external device has an I/O-compliant storage, attempting to create a file directory inside the external device, and if the file directory is successfully created: transferring at least some multimedia data to the external device; else if the file directory is not successfully created: indicating that the apparatus and the external device are not compatible.

In another embodiment of the invention, a method for intelligent analysis of adaptive processing of multimedia data by an apparatus is disclosed. This method comprises the steps of: determining a remaining storage space in an external device operatively connected to the apparatus, and if a desired end time of recording multimedia data is known: determining and/or selecting a compatible encoding method for a stream of the multimedia data which will be transmitted to the external device, wherein the stream of the multimedia data is strategically encoded at a first compatible and highest-possible-quality sampling rate to fit inside an available storage space of the external device until the desired end time of recording for the external device is reached; else if the desired end time of recording the multimedia is unknown: encoding a current stream of the multimedia data at a second compatible and highest-possible-quality sampling rate for the external device, buffering an encoded current stream of the multimedia data in memory and transmitting the encoded current stream of the multimedia data to the external device, and if a threshold value for low storage space is reached in the external device: encoding a subsequent stream of the multimedia data at a lower-quality compatible sampling rate from the apparatus for transfer to the external device.

Yet in another embodiment of the invention, an apparatus for intelligent analysis of device compatibility and adaptive processing of multimedia data is disclosed. This apparatus comprises an analog-to-digital converter (ADC) unit configured to receive and convert an incoming stream of multimedia data signals to a pre-encoded stream of digitized data, a codec (encoding and/or decoding) unit configured to encode the pre-encoded stream of digitized data to an encoded stream of a standard multimedia encoding format, a buffer memory unit configured to store the encoded stream of the standard multimedia encoding format, a system memory unit configured to store operating instructions and/or data for the apparatus, and a central processing unit (CPU) operatively connected to the ADC unit, the codec, the buffer memory unit, and the system memory unit, wherein the CPU is configured to execute the intelligent analysis of device compatibility and adaptive processing of multimedia data.

BRIEF DESCRIPTION OF DRAWINGS

FIG. 7 shows an example of a look-up table containing external device-specific characteristics in accordance with an embodiment of the invention.

FIG. 8 shows an example of multimedia data encoding types and rates in accordance with an embodiment of the invention.

DETAILED DESCRIPTION

Figure 1:
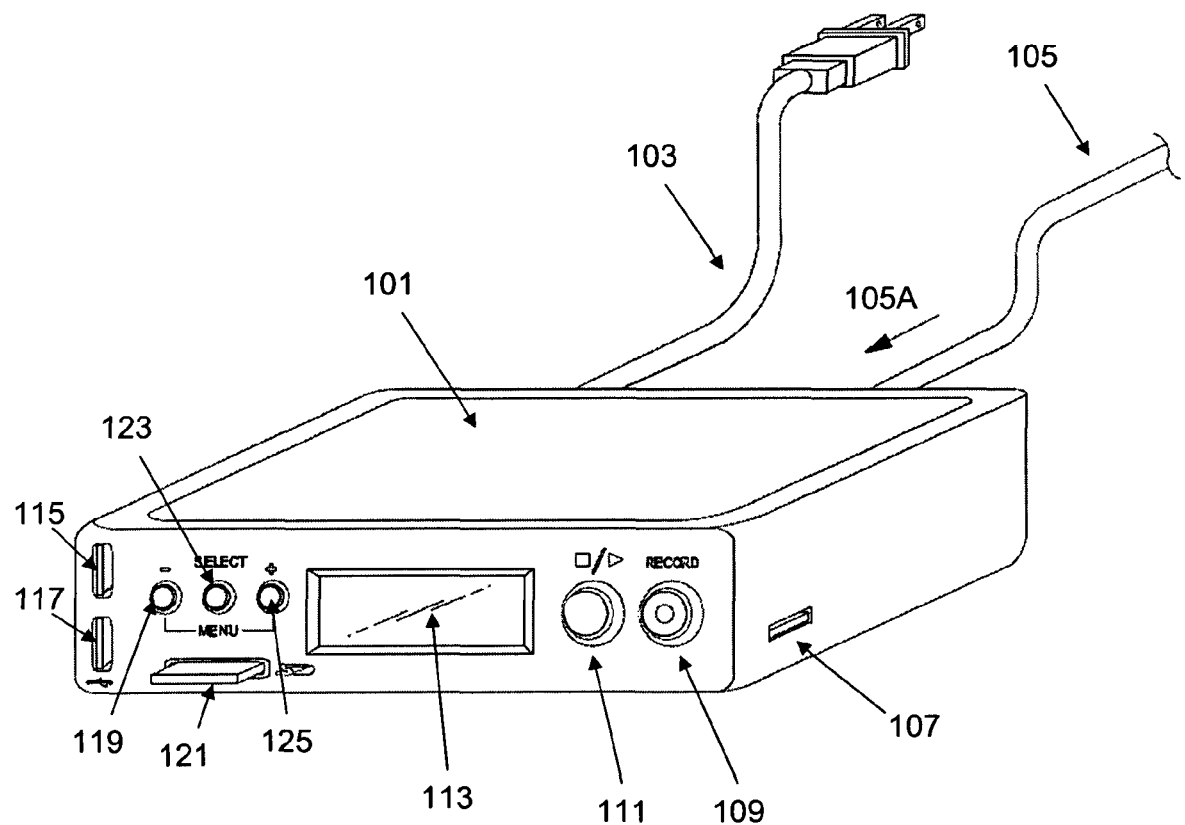
FIG. 1 shows a front view of an apparatus capable of intelligent analysis of device compatibility and adaptive processing of multimedia data in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble an apparatus and a method for conducting one or more intelligent analysis for device compatibility. Furthermore, the detailed description is also presented in terms of procedures, logic blocks, processing, and/or other symbolic representations that directly or indirectly resemble an apparatus and a method for conducting one or more intelligent analysis for adaptive processing of multimedia data. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "adaptive processing of multimedia data" is defined at least as adaptive encoding and transfer of multimedia data from an apparatus to another device operatively connected to the apparatus. Furthermore, the term "adaptive processing of multimedia data" can also include writing the multimedia data into a storage space of the device operatively connected to the apparatus. In one embodiment of the invention, the adaptive encoding involves encoding a stream of multimedia data at one specific sampling rate. In another embodiment of the invention, the adaptive encoding involves varying sampling rates for multimedia data encoding based on a remaining storage space of a device operatively connected to an apparatus.

Furthermore, for the purpose of describing the invention, a term "external device" is defined as an electronic device which is configured to be operatively connected to an apparatus via an input/output (I/O) port. In one embodiment of the invention, the apparatus is capable of performing an intelligent analysis of device compatibility and adaptive processing of multimedia data. Examples of an external device include, but are not limited to, a portable video player, a USB drive, a portable music player, and a cellular phone.

In addition, for the purpose of describing the invention, a term "conditional logic" is defined as one or more logical conditions (e.g. if-then, if-then-else, and etc.) required to execute a particular procedure or a particular instruction.

Moreover, for the purpose of describing the invention, a term "codec" is defined as a decoder, an encoder, or an encoder/decoder combination for processing of multimedia data such as audio and/or video data.

In general, embodiments of the invention relate to electronic device interactions and data processing. More specifically, the invention relates to an apparatus and a method for intelligent analysis of device compatibility, wherein the apparatus is capable of analyzing device compatibility even when a device driver for an external device (i.e. operatively connected to the apparatus) does not exist or is unavailable. Furthermore, the invention also relates to an apparatus and a method for intelligent analysis of adaptive processing of multimedia data between the apparatus and an external device, wherein the apparatus is capable of adjusting a sampling rate of encoding of the multimedia data based on a remaining storage of the external device.

One objective of the invention is to provide an apparatus and a method for intelligent analysis of device compatibility even for situations when a device driver for an external device does not exist or is unavailable to the apparatus.

Another objective of the invention is to use a look-up table (LUT) containing external device-specific characteristics and conditional logic as an attempt to find a known file structure inside the external device as part of the intelligent analysis of device compatibility.

In addition, another objective of the invention is to conduct an intelligent analysis of adaptive processing (e.g. encoding, transferring, and/or writing) of multimedia data between the apparatus and an external device, wherein the apparatus, at least in one specific mode of operation, is capable of adjusting a sampling rate of encoding of the multimedia data based on a remaining storage of the external device.

FIG. 1 shows a front view of an apparatus (100) capable of intelligent analysis of device compatibility and adaptive processing of multimedia data in accordance with an embodiment of the invention. In a preferred embodiment of the invention, the apparatus (100) is a set-top box (101) which is configured to receive an incoming stream of multimedia data signals (105A) from a data-transmitting medium (105). In case of the preferred embodiment of the invention, the incoming stream of multimedia data signals (105A) then goes through one or more signal transformations, signal processing, and/or digitized data encoding inside the set-top box (101) before an encoded stream of data is transmitted to an external device. Examples of an external device include an SD card storage (121) operatively connected to the apparatus (100) and any USB-compliant device operatively connected to one or more USB ports (107, 115, 117). In one embodiment of the invention, the data-transmitting medium (105) is a copper-wire cable. In another embodiment of the invention, the data-transmitting medium (105) is a wireless transmitter sending signals to the apparatus (100). Yet in another embodiment of the invention, the data-transmitting medium (105) is a fiber optic line capable of transmitting optical signals to the apparatus (100).

In the preferred embodiment of the invention, the set-top box (101) also has a power cord (103) which receives an external electrical power to operate at least some internal electronic circuitry of the set-top box (101). The set-top box (101) also has a "Record" button (109) and a "Replay/Stop" button (111). In one instance of the preferred embodiment, pressing the "Record" button (109) initiates signal processing and conversion of an incoming stream of multimedia signals (105A) for transmission of a digitally-encoded stream of multimedia signals (105A) to an SD card (121) or a USB-compliant device operatively connected to a USB port (107, 115, 117) of the set-top box (101). Furthermore, in one instance of the preferred embodiment, pressing the "Replay/Stop" button (111) either triggers a "playback" command for encoded streams of the multimedia data or a "stop" command for transmission of the encoded streams of the multimedia data to an external device operatively connected to the set-top box (101). In one example of the "playback" command, the encoded streams of the multimedia data which have been already transmitted to an external device are "played back" on a display screen and/or a speaker attached or associated with the external device. In another example of the "playback" command, the encoded streams of the multimedia data which are buffered inside the set-top box and are not yet transmitted to the external device are "played back" on a display screen operatively connected to the set-top box (101). Examples of the display screen include, but are not limited to, an embedded display (113) of the set-top box, a display panel attached to another device other than the external device, and a display panel attached to the external device itself.

Continuing with FIG. 1, in the preferred embodiment of the invention, the embedded display (113) of the set-top box (101) is configured to display multimedia recording-related information such as date, time, encoding modes, TV/Video channel information, recording durations, recording reservation information, and etc. In one embodiment of the invention, a menu "select" button (123) is used to navigate menus and/or enter desired menu choices based on a user selection. In addition, menu assistance buttons (e.g. a "−" button (119), a "+" button (125)) can also be used for navigation of menus supplied by an embedded software of the set-top box (101). In one embodiment of the invention, a plurality of I/O ports (e.g. 107, 115, 117) are attached to the apparatus (100). In a preferred embodiment of the invention, the plurality of I/O ports are a USB-compliant port (e.g. 107, 115, 117) and an SD-card port configured to accept an SD card (121). Other possible types of I/O ports include, but are not limited to, a FireWire port, an HDMI port, a Micro SD port, and an optical data transmission port.

Continuing with FIG. 1, in the preferred embodiment of the invention, the incoming stream of multimedia data signals (105A) is in analog domain which is first converted into a pre-encoded stream of digitized data by an analog-to-digital converter (ADC) in the apparatus (100). Then, the pre-encoded stream of digitized data is further converted into an encoded stream of a standard multimedia encoding format, such as H.264, WMV, or DivX. In the preferred embodiment of the invention, the set-top box (101) may dynamically gather some information from an external device (e.g. an SD card (121) or a USB-compliant device connected to a USB port (107, 115, 117)) to adjust a sampling rate for encoding the pre-encoded stream into a standard multimedia encoding format before an encoded stream is transmitted to the external device. In the preferred embodiment of the invention, the information gathered from the external device may be a remaining storage space in the external device.

In one example of the preferred embodiment of the invention, the set-top box (101) has an "adaptive encoding" mode which continuously monitors the remaining storage space of the external device. In the "adaptive encoding" mode, the set-top box (101) may or may not know a desired end time of recording by a user. If the desired end time of recording is known at the time of recording command (e.g. pressing a "Record" button (109)), then the set-top box (101) can simply calculate the amount of storage space required in the external device to transfer all streams of relevant multimedia data. If the set-top box (101) determines that the external device has sufficient storage space even for a highest-quality sampling rate which is compatible with the external device, then the set-top box (101) may begin processing and transfer of the multimedia data to the external device at the highest-quality sampling rate. On the other hand, if the set-top box (101) determines that the external device has only sufficient storage for a lower-quality sampling rate for a standard multimedia encoding format, then the lower-quality sampling rate may be automatically used for encoding streams of the multimedia data for space-fitting transfer of the multimedia data to the external device.

In contrast, if the set-top box (101) does not know a desired end time of recording by the user because the user never specified the end time of multimedia data transfer to an external device, then the set-top box (101) can encode and transmit streams of multimedia data at a highest-possible-quality sampling rate until a threshold value for low available storage space is reached from the external device. Once the threshold value for low storage space is reached, the set-top box (101) can encode a subsequent stream of the multimedia data at a lower-quality sampling rate to cram in as many subsequent streams of multimedia data as possible until the low available storage space for the external device is completely consumed.

Figure 2:
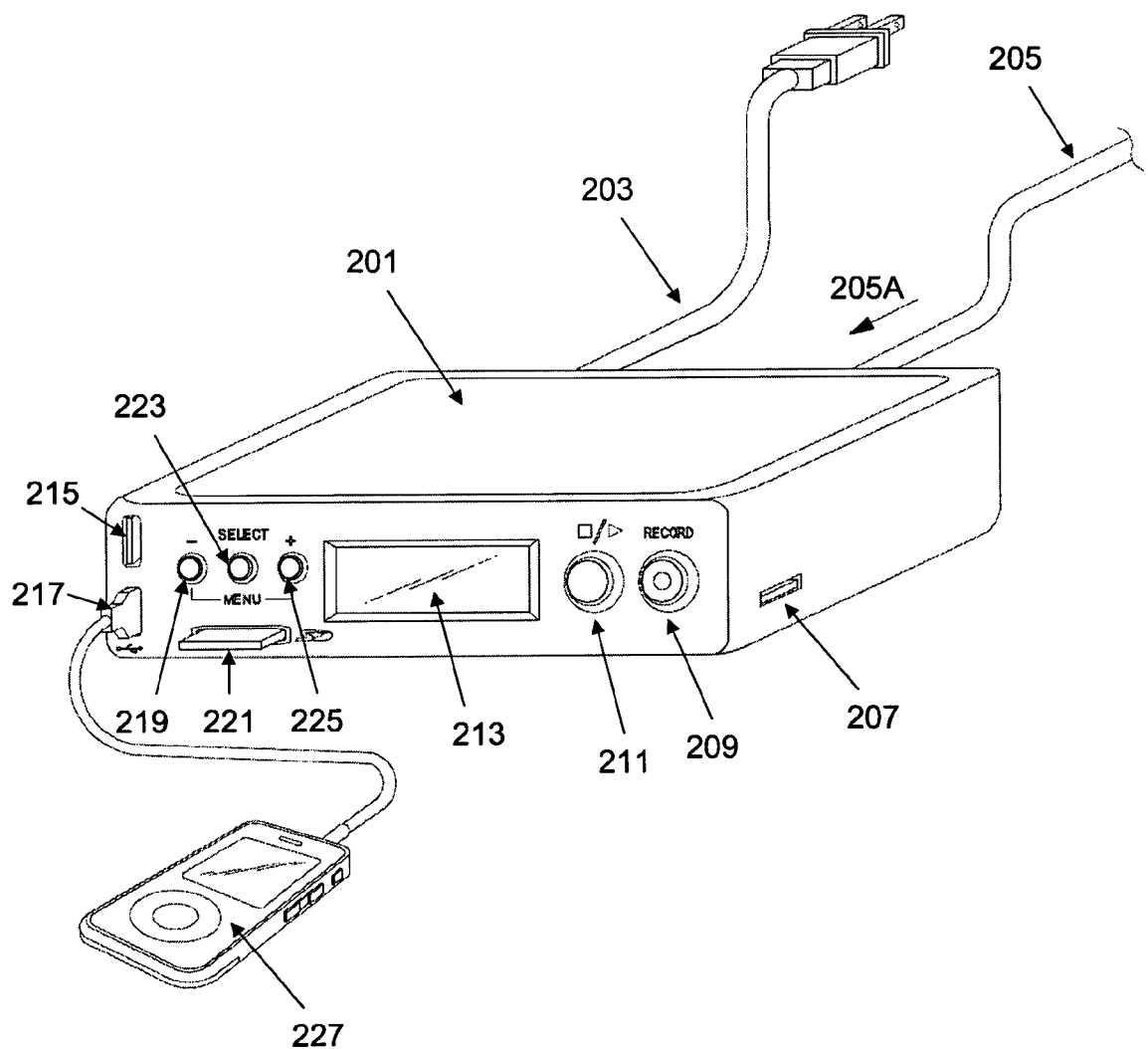
FIG. 2 shows a front view of a first portable electronic device connected to an apparatus capable of intelligent analysis of device compatibility and adaptive processing of multimedia data in accordance with an embodiment of the invention.

FIG. 2 shows a front view (200) of a first portable electronic device (227) operatively connected to an apparatus (201) capable of intelligent analysis of device compatibility and adaptive processing of multimedia data in accordance with an embodiment of the invention. In one embodiment of the invention, the first portable electronic device (227) is a portable multimedia player which can store and decode a stream of multimedia data in a standard multimedia format (e.g. H.264, WMV, DivX, MP3, and etc.) for a playback through its display panel and/or speaker. In a preferred embodiment of the invention, the first portable electronic device (227) is operatively connected to the apparatus (e.g. set-top box (201)) via a USB cable and a first USB port (217).

The apparatus (e.g. set-top box (201)) in accordance with the present invention is capable of performing an intelligent analysis of device compatibility between the apparatus and an external device (e.g. the first portable electronic device (227)) once the external device is operatively connected to the apparatus (e.g. set-top box (201)). In a preferred embodiment of the invention, the apparatus first detects an operative connection of an external device (e.g. 227) to an I/O port (e.g. the first USB port (217)). In one example, the detection of operative connection is accomplished by checking voltage levels of one or more pins inside the I/O port. In another example, the detection of operative connection is accomplished by an initial wireless communication attempt between the I/O port and the apparatus. Then, the apparatus executes or attempts to execute an I/O-specific protocol for tests, mounting, and/or signature file access from the apparatus to the external device. In one example, the I/O-specific protocol for tests, mounting, and/or signature file access can be based on USB-standard specifications. In another example, the I/O-specific protocol for tests, mounting, and/or signature file access can be based on FireWire-standard specifications. Yet in another example, the I/O-specific protocol for tests, mounting, and/or signature file access can be based on Wi-LAN or IEEE 802.11 specifications.

Continuing with FIG. 2, once the external device (e.g. 227) and the apparatus (e.g. 201) goes through their I/O-specific test, mounting, and signature file access procedures, the apparatus (e.g. 201) uses a look-up table (LUT) containing external device-specific characteristics and conditional logic as an attempt to find a known file structure inside the external device (e.g. 227). The use of the LUT does not need to involve device driver information for the external device, because the apparatus will attempt to determine a particular model and type of the external device by making educated guesses (i.e. using conditional logic) via if-then and/or if-then-else statements in its attempt to find a known file structure inside the external device (e.g. 227). In one embodiment of the invention, the educated guesses using the conditional logic includes parsing serial numbers and/or model names of the external device even when the device driver for the external device is unavailable.

In a preferred embodiment of the invention, the LUT for external device-specific characteristics and conditional logic contained inside the apparatus (e.g. 201) includes information related to compatible data sampling rates (e.g. EP, LP, SP), multimedia codec types (e.g. H.264, WMV, DivX, MP3), and native display resolutions (e.g. QVGA, VGA, SVGA, XGA) for numerous kinds of external devices which may be potentially be connected to the apparatus. It is important to note that the external device-specific characteristics in the LUT are not provided by device drivers of external devices. In a typical embodiment of the invention, many external devices may not ever supply device drivers to the apparatus, because the external device manufacturers may not be aware of the apparatus or simply did not provide an explicit compatibility solution for the apparatus. A unique aspect of the present invention for intelligent analysis of device compatibility is that the LUT is typically pre-stored inside the apparatus and comprises of information which are publicly available through user manuals or specifications of common external devices. In a preferred embodiment of the invention, the LUT is periodically updated by a distributor and/or manufacturer of the apparatus (e.g. set-top box (201)).

Continuing with FIG. 2, in a preferred embodiment of the invention, if the known file structure is found inside the external device (e.g. 227), then the apparatus (e.g. 201) has identified essential external device-specific characteristics such as compatible data sampling rates (e.g. EP, LP, SP), compatible multimedia codec types (e.g. H.264, WMV, DivX, MP3), and desired native display resolutions (e.g. QVGA, VGA, SVGA, XGA) specifically for the external device (e.g. 227) from its LUT entries, based on its intelligent device compatibility analysis.

On the other hand, if the known file structure is not found inside the external device (e.g. 227), then the apparatus (e.g. 201) cannot identify the essential device-specific characteristics for the external device (e.g. 227). In a preferred embodiment of the invention, a failure to identify the known file structure inside the external device will prompt the apparatus (e.g. 201) to make an assumption that the external device (e.g. 227) has an I/O-compliant storage space (e.g. a USB-compliant storage space inside the first portable electronic device (227)). Then, the apparatus (e.g. 201) will attempt to create a file directory inside the external device (e.g. 227). If the file directory is successfully created, the apparatus (e.g. 201) can at least transfer some multimedia data to the external device (e.g. 227) based on a user command to the apparatus (e.g. 201) using one or more command buttons (e.g. 209, 211, 219, 223, 225). In contrast, if the file directory is not successfully created inside the external device (e.g. 227), then the apparatus (e.g. 201) can indicate that the apparatus and the external devices are fatally incompatible using an embedded display (213), an externally-connected display panel, and/or an attached speaker.

In one embodiment of the invention, an SD card (221) is designated as a backup storage for raw or transformed incoming stream of multimedia data signals, when and if no other external devices are operatively connected to the apparatus (e.g. 201). At least in one mode of operation, once another external device (e.g. 227) other than the SD card (221) is operatively connected to the apparatus (e.g. 201), the multimedia data stored in the SD card (221) can be transmitted to the other external device (e.g. 227). The backup storage (e.g. 221) can also simply be used as a buffer space prior to transmission of transformed, processed, and/or encoded multimedia data to another external device (e.g. 227).

Continuing with FIG. 2, in a preferred embodiment of the invention, the apparatus (e.g. 201) is a set-top box (201), which is configured to receive an incoming stream of multimedia data signals (205A) from a data-transmitting medium (205). In case of the preferred embodiment of the invention, the incoming stream of multimedia data signals (205A) then goes through one or more signal transformations, signal processing, and/or digitized data encoding inside the set-top box (201) before an encoded stream of data is transmitted to an external device. Examples of an external device include an SD card storage (221) operatively connected to the apparatus (e.g. set-top box (201)) and any USB-compliant device operatively connected to one or more USB ports (207, 215, 217). In one embodiment of the invention, the data-transmitting medium (205) is a copper-wire cable. In another embodiment of the invention, the data-transmitting medium (205) is a wireless transmitter sending signals to the apparatus (e.g. set-top box (201)). Yet in another embodiment of the invention, the data-transmitting medium (205) is a fiber optic line capable of transmitting optical signals to the apparatus (e.g. set-top box (201)).

In the preferred embodiment of the invention, the set-top box (201) also has a power cord (203) which receives an external electrical power to operate at least some internal electronic circuitry of the set-top box (201). The set-top box (201) also has a "Record" button (209) and a "Replay/Stop" button (211). In one instance of the preferred embodiment, pressing the "Record" button (209) initiates signal processing and conversion of an incoming stream of multimedia signals (205A) for transmission of a digitally-encoded stream of multimedia signals (205A) to an SD card (221) or a USB-compliant device operatively connected to a USB port (207, 215, 217) of the set-top box (201). Furthermore, in one instance of the preferred embodiment, pressing the "Replay/Stop" button (211) either triggers a "playback" command for encoded streams of the multimedia data or a "stop" command for transmission of the encoded streams of the multimedia data to an external device operatively connected to the set-top box (201). In one example of the "playback" command, the encoded streams of the multimedia data which have been already transmitted to an external device are "played back" on a display screen and/or a speaker attached or associated with the external device. In another example of the "playback" command, the encoded streams of the multimedia data which are buffered inside the set-top box and are not yet transmitted to the external device are "played back" on a display screen operatively connected to the set-top box (201). Examples of the display screen include, but are not limited to, an embedded display (213) of the set-top box, a display panel attached to another device other than the external device, and a display panel attached to the external device itself.

Continuing with FIG. 2, in the preferred embodiment of the invention, the embedded display (213) of the set-top box (201) is configured to display multimedia recording-related information such as date, time, encoding modes, TV/Video channel information, recording durations, recording reservation information, and etc. In one embodiment of the invention, a menu "select" button (223) is used to navigate menus and/or enter desired menu choices based on a user selection. In addition, menu assistance buttons (e.g. a "−" button (219), a "+" button (225)) can also be used for navigation of menus supplied by an embedded software of the set-top box (201). In one embodiment of the invention, a plurality of I/O ports (e.g. 207, 215, 217) are attached to the apparatus (e.g. set-top box (201)). In a preferred embodiment of the invention, the plurality of I/O ports are a USB-compliant port (e.g. 207, 215, 217) and an SD-card port configured to accept an SD card (221). Other possible types of I/O ports include, but are not limited to, a FireWire port, an HDMI port, a Micro SD port, and an optical data transmission port.

Continuing with FIG. 2, in the preferred embodiment of the invention, the incoming stream of multimedia data signals (205A) is in analog domain which is first converted into a pre-encoded stream of digitized data by an analog-to-digital converter (ADC) in the apparatus (e.g. set-top box (201)). Then, the pre-encoded stream of digitized data is further converted into an encoded stream of a standard multimedia encoding format, such as H.264, WMV, or DivX. In the preferred embodiment of the invention, the set-top box (201) may dynamically gather some information from an external device (e.g. an SD card (221) or a USB-compliant device (e.g. 227) connected to a USB port (207, 215, 217)) to adjust a sampling rate for encoding the pre-encoded stream into a standard multimedia encoding format before an encoded stream is transmitted to the external device. In the preferred embodiment of the invention, the information gathered from the external device may be a remaining storage space in the external device (e.g. 227).

In one example of the preferred embodiment of the invention, the set-top box (201) has an "adaptive encoding" mode which continuously monitors the remaining storage space of the external device (e.g. 227). In the "adaptive encoding" mode, the set-top box (201) may or may not know a desired end time of recording by a user. If the desired end time of recording is known at the time of recording command (e.g. pressing a "Record" button (209)), then the set-top box (201) can simply calculate the amount of storage space required in the external device to transfer all streams of relevant multimedia data. If the set-top box (201) determines that the external device has sufficient storage space even for a highest-quality sampling rate (e.g. an SP-mode) which is compatible with the external device, then the set-top box (201) may begin processing and transfer of the multimedia data to the external device at the highest-quality sampling rate. On the other hand, if the set-top box (201) determines that the external device has only sufficient storage for a lower-quality sampling rate (e.g. an LP-mode or an EP-mode) for a standard multimedia encoding format, then the lower-quality sampling rate may be automatically used for encoding streams of the multimedia data for space-fitting transfer of the multimedia data to the external device.

In contrast, if the set-top box (201) does not know a desired end time of recording by the user because the user never specified the end time of multimedia data transfer to an external device, then the set-top box (201) can encode and transmit streams of multimedia data at a highest-possible-quality sampling rate (e.g. an SP-mode) until a threshold value for low available storage space is reached from the external device. Once the threshold value for low storage space is reached, the set-top box (201) can encode a subsequent stream of the multimedia data at a lower-quality sampling rate (e.g. an LP-mode or an EP-mode) to "cram-in" as many subsequent streams of multimedia data as possible until the low available storage space for the external device is completely consumed or until the user commands the apparatus to stop transmission of the multimedia data.

Figure 3:
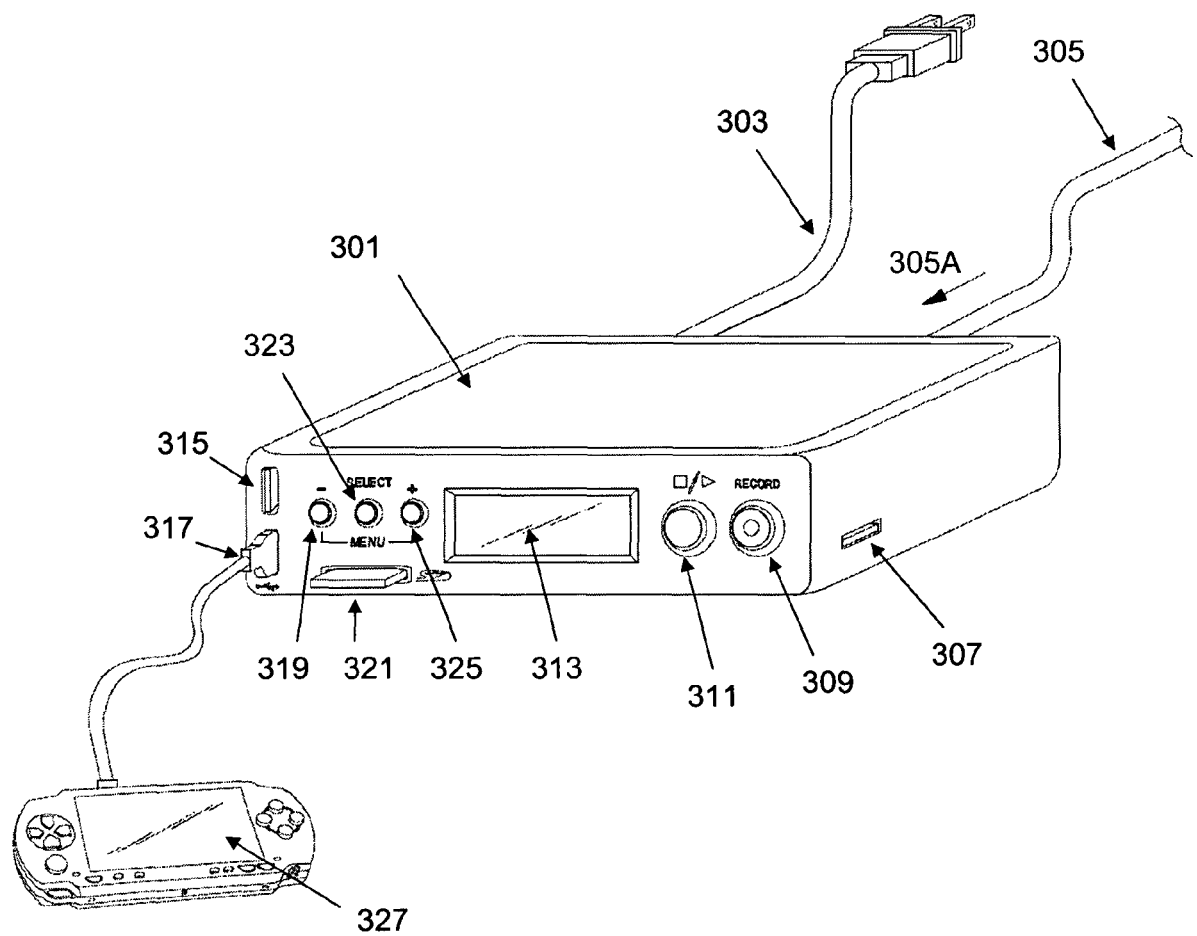
FIG. 3 shows a front view of a second portable electronic device connected to an apparatus capable of intelligent analysis of device compatibility and adaptive processing of multimedia data in accordance with an embodiment of the invention.

FIG. 3 shows a front view (300) of a second portable electronic device (327) connected to an apparatus (e.g. 301) capable of intelligent analysis of device compatibility and adaptive processing of multimedia data in accordance with an embodiment of the invention. In a preferred embodiment of the invention, the second portable electronic device (327) is operatively connected to the apparatus (e.g. set-top box (301)) via a USB cable and a first USB port (317). In one embodiment of the invention, the second portable electronic device (327) is a substantially different portable multimedia player from the first portable electronic device (227) which were previously shown and described in FIG. 2. For example, the second portable electronic device (327) may have different native display resolution for its display panel and different compatible data sampling rates and multimedia codec types, compared to those of the first portable electronic device (227). It should be noted that a different native display resolution for an external device may require a different type of multimedia data transformations and encoding methods prior to transmission of data from the apparatus (e.g. 301) to an external device (e.g. 227, 327).

The apparatus (e.g. set-top box (301)) in accordance with the present invention is capable of performing an intelligent analysis of device compatibility between the apparatus and an external device (e.g. the second portable electronic device (327)) once the external device is operatively connected to the apparatus (e.g. set-top box (301)). In a preferred embodiment of the invention, the apparatus first detects an operative connection of an external device (e.g. 327) to an I/O port (e.g. the first USB port (317)). In one example, the detection of operative connection is accomplished by checking voltage levels of one or more pins inside the I/O port. In another example, the detection of operative connection is accomplished by an initial wireless communication attempt between the I/O port and the apparatus. Then, the apparatus executes or attempts to execute an I/O-specific protocol for tests, mounting, and/or signature file access from the apparatus to the external device. In one example, the I/O-specific protocol for tests, mounting, and/or signature file access can be based on USB-standard specifications. In another example, the I/O-specific protocol for tests, mounting, and/or signature file access can be based on FireWire-standard specifications. Yet in another example, the I/O-specific protocol for tests, mounting, and/or signature file access can be based on Wi-LAN or IEEE 802.11 specifications.

Continuing with FIG. 3, once the external device (e.g. 327) and the apparatus (e.g. 301) goes through their I/O-specific test, mounting, and signature file access procedures, the apparatus (e.g. 301) uses a look-up table (LUT) containing external device-specific characteristics and conditional logic as an attempt to find a known file structure inside the external device (e.g. 327). The use of the LUT does not need to involve device driver information for the external device, because the apparatus will attempt to determine a particular model and type of the external device by making educated guesses (i.e. using conditional logic) via if-then and/or if-then-else statements in its attempt to find a known file structure inside the external device (e.g. 327). In one embodiment of the invention, the educated guesses using the conditional logic includes parsing serial numbers and/or model names of the external device even when the device driver for the external device is unavailable.

In a preferred embodiment of the invention, the LUT for external device-specific characteristics and conditional logic contained inside the apparatus (e.g. 301) includes information related to compatible data sampling rates (e.g. EP, LP, SP), multimedia codec types (e.g. H.264, WMV, DivX, MP3), and native display resolutions (e.g. QVGA, VGA, SVGA, XGA) for numerous kinds of external devices which may be potentially be connected to the apparatus. It is important to note that the external device-specific characteristics in the LUT are not provided by device drivers of external devices. In a typical embodiment of the invention, many external devices may not ever supply device drivers to the apparatus, because the external device manufacturers may not be aware of the apparatus or simply did not provide an explicit compatibility solution for the apparatus. A unique aspect of the present invention for intelligent analysis of device compatibility is that the LUT is typically pre-stored inside the apparatus and comprises of information which are publicly available through user manuals or specifications of common external devices. In a preferred embodiment of the invention, the LUT is periodically updated by a distributor and/or manufacturer of the apparatus (e.g. set-top box (301)).

Continuing with FIG. 3, in a preferred embodiment of the invention, if the known file structure is found inside the external device (e.g. 327), then the apparatus (e.g. 301) has identified essential external device-specific characteristics such as compatible data sampling rates (e.g. EP, LP, SP), compatible multimedia codec types (e.g. H.264, WMV, DivX, MP3), and desired native display resolutions (e.g. QVGA, VGA, SVGA, XGA) specifically for the external device (e.g. 327) from its LUT entries, based on its intelligent device compatibility analysis.

On the other hand, if the known file structure is not found inside the external device (e.g. 327), then the apparatus (e.g. 301) cannot identify the essential device-specific characteristics for the external device (e.g. 327). In a preferred embodiment of the invention, a failure to identify the known file structure inside the external device will prompt the apparatus (e.g. 301) to make an assumption that the external device (e.g. 327) has an I/O-compliant storage space (e.g. a USB-compliant storage space inside the second portable electronic device (327)). Then, the apparatus (e.g. 301) will attempt to create a file directory inside the external device (e.g. 327). If the file directory is successfully created, the apparatus (e.g. 301) can at least transfer some multimedia data to the external device (e.g. 327) based on a user command to the apparatus (e.g. 301) using one or more command buttons (e.g. 309, 311, 319, 323, 325). In contrast, if the file directory is not successfully created inside the external device (e.g. 327), then the apparatus (e.g. 301) can indicate that the apparatus and the external devices are fatally incompatible using an embedded display (313), an externally-connected display panel, and/or an attached speaker.

In one embodiment of the invention, an SD card (321) is designated as a backup storage for raw or transformed incoming stream of multimedia data signals, when and if no other external devices are operatively connected to the apparatus (e.g. 301). At least in one mode of operation, once another external device (e.g. 327) other than the SD card (321) is operatively connected to the apparatus (e.g. 301), the multimedia data stored in the SD card (321) can be transmitted to the other external device (e.g. 327). The backup storage (e.g. 321) can also simply be used as a buffer space prior to transmission of transformed, processed, and/or encoded multimedia data to another external device (e.g. 327).

Continuing with FIG. 3, in a preferred embodiment of the invention, the apparatus (e.g. 301) is a set-top box (301), which is configured to receive an incoming stream of multimedia data signals (305A) from a data-transmitting medium (305). In case of the preferred embodiment of the invention, the incoming stream of multimedia data signals (305A) then goes through one or more signal transformations, signal processing, and/or digitized data encoding inside the set-top box (301) before an encoded stream of data is transmitted to an external device. Examples of an external device include an SD card storage (321) operatively connected to the apparatus (e.g. set-top box (301)) and any USB-compliant device operatively connected to one or more USB ports (307, 315, 317). In one embodiment of the invention, the data-transmitting medium (305) is a copper-wire cable. In another embodiment of the invention, the data-transmitting medium (305) is a wireless transmitter sending signals to the apparatus (e.g. set-top box (301)). Yet in another embodiment of the invention, the data-transmitting medium (305) is a fiber optic line capable of transmitting optical signals to the apparatus (e.g. set-top box (301)).

In the preferred embodiment of the invention, the set-top box (301) also has a power cord (303) which receives an external electrical power to operate at least some internal electronic circuitry of the set-top box (301). The set-top box (301) also has a "Record" button (309) and a "Replay/Stop"

button (311). In one instance of the preferred embodiment, pressing the "Record" button (309) initiates signal processing and conversion of an incoming stream of multimedia signals (305A) for transmission of a digitally-encoded stream of multimedia signals (305A) to an SD card (321) or a USB-compliant device operatively connected to a USB port (307, 315, 317) of the set-top box (301). Furthermore, in one instance of the preferred embodiment, pressing the "Replay/Stop" button (311) either triggers a "playback" command for encoded streams of the multimedia data or a "stop" command for transmission of the encoded streams of the multimedia data to an external device operatively connected to the set-top box (301). In one example of the "playback" command, the encoded streams of the multimedia data which have been already transmitted to an external device are "played back" on a display screen and/or a speaker attached or associated with the external device. In another example of the "playback" command, the encoded streams of the multimedia data which are buffered inside the set-top box and are not yet transmitted to the external device are "played back" on a display screen operatively connected to the set-top box (301). Examples of the display screen include, but are not limited to, an embedded display (313) of the set-top box, a display panel attached to another device other than the external device, and a display panel attached to the external device itself.

Continuing with FIG. 3, in the preferred embodiment of the invention, the embedded display (313) of the set-top box (301) is configured to display multimedia recording-related information such as date, time, encoding modes, TV/Video channel information, recording durations, recording reservation information, and etc. In one embodiment of the invention, a menu "select" button (323) is used to navigate menus and/or enter desired menu choices based on a user selection. In addition, menu assistance buttons (e.g. a "−" button (319), a "+" button (325)) can also be used for navigation of menus supplied by an embedded software of the set-top box (301). In one embodiment of the invention, a plurality of I/O ports (e.g. 307, 315, 317) are attached to the apparatus (e.g. set-top box (301)). In a preferred embodiment of the invention, the plurality of I/O ports are a USB-compliant port (e.g. 307, 315, 317) and an SD-card port configured to accept an SD card (321). Other possible types of I/O ports include, but are not limited to, a FireWire port, an HDMI port, a Micro SD port, and an optical data transmission port.

Continuing with FIG. 3, in the preferred embodiment of the invention, the incoming stream of multimedia data signals (305A) is in analog domain which is first converted into a pre-encoded stream of digitized data by an analog-to-digital converter (ADC) in the apparatus (e.g. set-top box (301)). Then, the pre-encoded stream of digitized data is further converted into an encoded stream of a standard multimedia encoding format, such as H.264, WMV, or DivX. In the preferred embodiment of the invention, the set-top box (301) may dynamically gather some information from an external device (e.g. an SD card (321) or a USB-compliant device (e.g. 327) connected to a USB port (307, 315, 317)) to adjust a sampling rate for encoding the pre-encoded stream into a standard multimedia encoding format before an encoded stream is transmitted to the external device. In the preferred embodiment of the invention, the information gathered from the external device may be a remaining storage space in the external device (e.g. 327).

In one example of the preferred embodiment of the invention, the set-top box (301) has an "adaptive encoding" mode which continuously monitors the remaining storage space of the external device (e.g. 327). In the "adaptive encoding" mode, the set-top box (301) may or may not know a desired end time of recording by a user. If the desired end time of recording is known at the time of recording command (e.g. pressing a "Record" button (309)), then the set-top box (301) can simply calculate the amount of storage space required in the external device to transfer all streams of relevant multimedia data. If the set-top box (301) determines that the external device has sufficient storage space even for a highest-quality sampling rate (e.g. an SP-mode) which is compatible with the external device, then the set-top box (301) may begin processing and transfer of the multimedia data to the external device at the highest-quality sampling rate. On the other hand, if the set-top box (301) determines that the external device has only sufficient storage for a lower-quality sampling rate (e.g. an LP-mode or an EP-mode) for a standard multimedia encoding format, then the lower-quality sampling rate may be automatically used for encoding streams of the multimedia data for space-fitting transfer of the multimedia data to the external device.

In contrast, if the set-top box (301) does not know a desired end time of recording by the user because the user never specified the end time of multimedia data transfer to an external device, then the set-top box (301) can encode and transmit streams of multimedia data at a highest-possible-quality sampling rate (e.g. an SP-mode) until a threshold value for low available storage space is reached from the external device. Once the threshold value for low storage space is reached, the set-top box (301) can encode a subsequent stream of the multimedia data at a lower-quality sampling rate (e.g. an LP-mode or an EP-mode) to "cram-in" as many subsequent streams of multimedia data as possible until the low available storage space for the external device is completely consumed or until the user commands the apparatus to stop transmission of the multimedia data.

Figure 4:
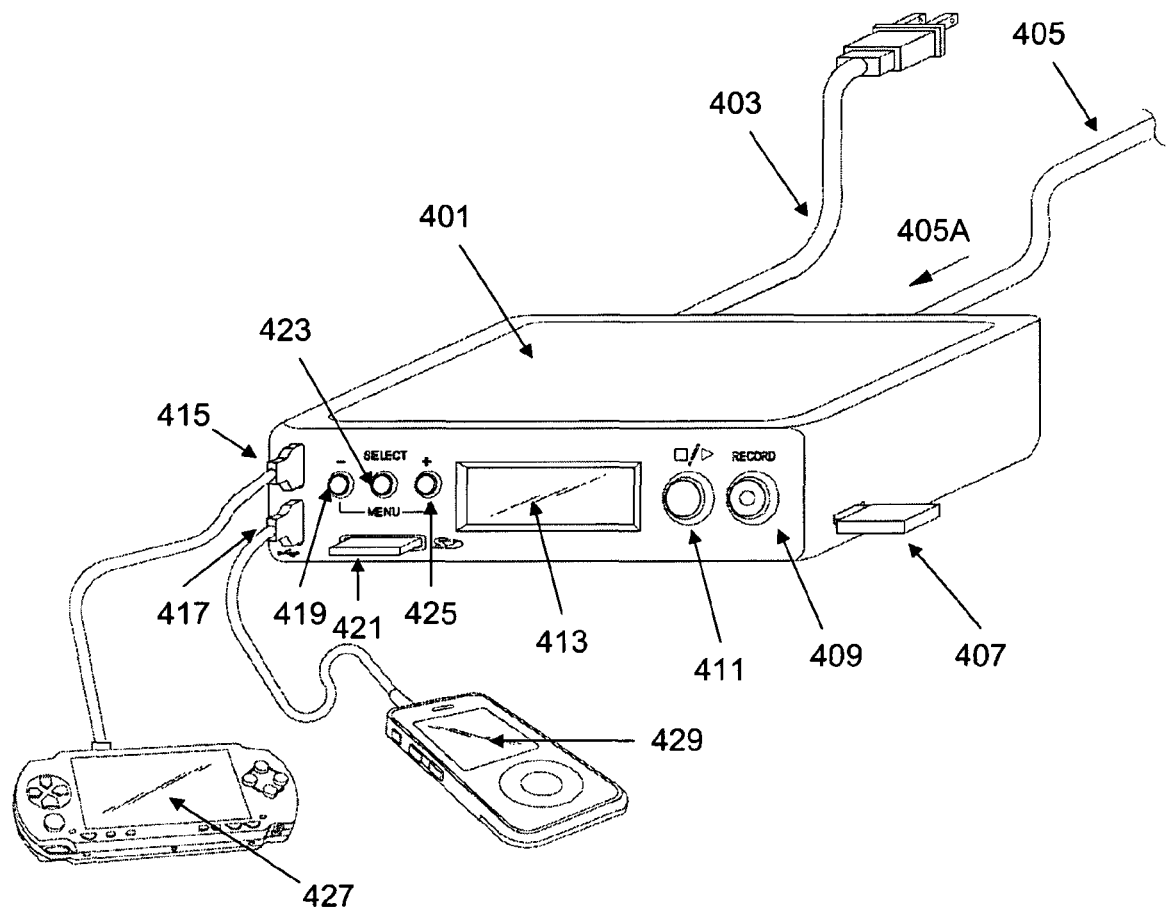
FIG. 4 shows a front view of both the first and the second portable electronic devices connected to an apparatus capable of intelligent analysis of device compatibility and adaptive processing of multimedia data in accordance with an embodiment of the invention.

FIG. 4 shows a front view (400) of both the first (429) and the second (427) portable electronic devices connected to an apparatus (e.g. 401) capable of intelligent analysis of device compatibility and adaptive processing of multimedia data in accordance with an embodiment of the invention. In addition, the apparatus (e.g. 401) is also operatively connected to a third portable electronic device (407). In one embodiment of the invention, all external devices (427, 429, 421, 407) operatively connected to the apparatus (e.g. 401) are mutually configured to transmit and/or receive data among each other, wherein the apparatus (e.g. 401), as a set-top box, is capable of providing signal transformations, conversions, and/or encoding necessary to make the multimedia data indirectly transmitted from one external device (e.g. 427) to another external device (e.g. 429) to be fully compatible during decoding, playback, and storage of the transmitted multimedia data.

In a preferred embodiment of the invention, the first portable electronic device (429) is operatively connected to the apparatus (e.g. set-top box (401)) via a USB cable and a first USB port (417), and a second portable electronic device (427) is operatively connected to the apparatus (e.g. set-top box (401)) via a USB cable and a second USB port (415). In one embodiment of the invention, the second portable electronic device (427) is a substantially different portable multimedia player from the first portable electronic device (429). For example, the second portable electronic device (427) may have a different native resolution for its display panel and different compatible data sampling rates and multimedia codec types, compared to those of the first portable electronic device (429). It should be noted that a different native display resolution for an external device may require a different type of multimedia data transformations and encoding methods prior to transmission of data from the apparatus (e.g. 401) to one or more external devices (e.g. 427, 429).

The apparatus (e.g. set-top box (401)) in accordance with the present invention is capable of performing an intelligent analysis of device compatibility among the apparatus and one or more external devices (e.g. 427, 429) once an external device is operatively connected to the apparatus. In a preferred embodiment of the invention, the apparatus first detects an operative connection of an external device (e.g. 407, 427, or 429) to an I/O port (e.g. 415 or 417). In one example, the detection of operative connection is accomplished by checking voltage levels of one or more pins inside the I/O port. In another example, the detection of operative connection is accomplished by an initial wireless communication attempt between the I/O port and the apparatus. Then, the apparatus executes or attempts to execute an I/O-specific protocol for tests, mounting, and/or signature file access from the apparatus to the external device. In one example, the I/O-specific protocol for tests, mounting, and/or signature file access can be based on USB-standard specifications. In another example, the I/O-specific protocol for tests, mounting, and/or signature file access can be based on FireWire-standard specifications. Yet in another example, the I/O-specific protocol for tests, mounting, and/or signature file access can be based on Wi-LAN or IEEE 802.11 specifications.

Continuing with FIG. 4, once an external device (e.g. 407, 427, or 429) and the apparatus (e.g. 401) goes through their I/O-specific test, mounting, and signature file access procedures, the apparatus (e.g. 401) uses a look-up table (LUT) containing external device-specific characteristics and conditional logic as an attempt to find a known file structure inside the external device (e.g. 407, 427, or 429). The use of the LUT does not need to involve device driver information for the external device, because the apparatus will attempt to determine a particular model and type of the external device by making educated guesses (i.e. using conditional logic) via if-then and/or if-then-else statements in its attempt to find a known file structure inside the external device (e.g. 407, 427, or 429). In one embodiment of the invention, the educated guesses using the conditional logic includes parsing serial numbers and/or model names of the external device even when the device driver for the external device is unavailable.

In a preferred embodiment of the invention, the LUT for external device-specific characteristics and conditional logic contained inside the apparatus (e.g. 401) includes information related to compatible data sampling rates (e.g. EP, LP, SP), multimedia codec types (e.g. H.264, WMV, DivX, MP3), and native display resolutions (e.g. QVGA, VGA, SVGA, XGA) for numerous kinds of external devices which may be potentially be connected to the apparatus. It is important to note that the external device-specific characteristics in the LUT are not typically provided by device drivers of external devices. In a typical embodiment of the invention, many external devices may not ever supply device drivers to the apparatus, because the external device manufacturers may not be aware of the apparatus or simply did not provide an explicit compatibility solution for the apparatus. A unique aspect of the present invention for intelligent analysis of device compatibility is that the LUT is typically pre-stored inside the apparatus and comprises of information which are publicly available through user manuals or specifications of common external devices. In a preferred embodiment of the invention, the LUT is periodically updated by a distributor and/or manufacturer of the apparatus (e.g. set-top box (401)).

Continuing with FIG. 4, in a preferred embodiment of the invention, if the known file structure is found inside the external device (e.g. 407, 427, or 429), then the apparatus (e.g. 401) has identified essential external device-specific characteristics such as compatible data sampling rates (e.g. EP, LP, SP), compatible multimedia codec types (e.g. H.264, WMV, DivX, MP3), and desired native display resolutions (e.g. QVGA, VGA, SVGA, XGA) specifically for the external device (e.g. 407, 427, or 429) from its LUT entries, based on its intelligent device compatibility analysis.

On the other hand, if the known file structure is not found inside the external device (e.g. 407, 427, or 429), then the apparatus (e.g. 401) cannot identify the essential device-specific characteristics for the external device (e.g. 407, 427, or 429). In a preferred embodiment of the invention, a failure to identify the known file structure inside the external device will prompt the apparatus (e.g. 401) to make an assumption that the external device (e.g. 407, 427, or 429) has an I/O-compliant storage space (e.g. a USB-compliant storage space inside the first portable electronic device (429), or a USB-compliant storage space inside the second portable electronic device (427)). Then, the apparatus (e.g. 401) will attempt to create a file directory inside the external device (e.g. 407, 427, or 429). If the file directory is successfully created, the apparatus (e.g. 401) can at least transfer some multimedia data to the external device (e.g. 407, 427, or 429) based on a user command to the apparatus (e.g. 401) using one or more command buttons (e.g. 409, 411, 419, 423, 425). In contrast, if the file directory is not successfully created inside the external device (e.g. 407, 427, or 429), then the apparatus (e.g. 401) can indicate that the apparatus and the external devices are fatally incompatible using an embedded display (413), an externally-connected display panel, and/or an attached speaker.

In one embodiment of the invention, an SD card (421) is designated as a backup storage for raw or transformed incoming stream of multimedia data signals, when and if no other external devices are operatively connected to the apparatus (e.g. 401). At least in one mode of operation, once another external device (e.g. 407, 427, or 429) other than the SD card (421) is operatively connected to the apparatus (e.g. 401), the multimedia data stored in the SD card (421) can be transmitted to the other external device (e.g. 407, 427, or 429). The backup storage (e.g. 421) can also simply be used as a buffer space prior to transmission of transformed, processed, and/or encoded multimedia data to another external device (e.g. 407, 427, or 429).

Continuing with FIG. 4, in a preferred embodiment of the invention, the apparatus (e.g. 401) is a set-top box (401), which is configured to receive an incoming stream of multimedia data signals (405A) from a data-transmitting medium (405). In case of the preferred embodiment of the invention, the incoming stream of multimedia data signals (405A) then goes through one or more signal transformations, signal processing, and/or digitized data encoding inside the set-top box (401) before an encoded stream of data is transmitted to an external device. Examples of an external device include an SD card storage (421) operatively connected to the apparatus (e.g. set-top box (401)) and any USB-compliant device operatively connected to one or more USB ports (e.g. 415, 417). In one embodiment of the invention, the data-transmitting medium (405) is a copper-wire cable. In another embodiment of the invention, the data-transmitting medium (405) is a wireless transmitter sending signals to the apparatus (e.g. set-top box (401)). Yet in another embodiment of the invention, the data-transmitting medium (405) is a fiber optic line capable of transmitting optical signals to the apparatus (e.g. set-top box (401)).

In the preferred embodiment of the invention, the set-top box (401) also has a power cord (403) which receives an external electrical power to operate at least some internal electronic circuitry of the set-top box (401). The set-top box (401) also has a "Record" button (409) and a "Replay/Stop" button (411). In one instance of the preferred embodiment, pressing the "Record" button (409) initiates signal processing and conversion of an incoming stream of multimedia signals (405A) for transmission of a digitally-encoded stream of multimedia signals (405A) to an SD card (421) or a USB-compliant device (e.g. 427 or 429) operatively connected to a USB port (415, 417) of the set-top box (401). Furthermore, in one instance of the preferred embodiment, pressing the "Replay/Stop" button (411) either triggers a "playback" command for encoded streams of the multimedia data or a "stop" command for transmission of the encoded streams of the multimedia data to an external device operatively connected to the set-top box (401). In one example of the "playback" command, the encoded streams of the multimedia data which have been already transmitted to an external device are "played back" on a display screen and/or a speaker attached or associated with the external device. In another example of the "playback" command, the encoded streams of the multimedia data which are buffered inside the set-top box and are not yet transmitted to the external device are "played back" on a display screen operatively connected to the set-top box (401). Examples of the display screen include, but are not limited to, an embedded display (413) of the set-top box, a display panel attached to another device other than the external device, and a display panel attached to the external device itself.

Continuing with FIG. 4, in the preferred embodiment of the invention, the embedded display (413) of the set-top box (401) is configured to display multimedia recording-related information such as date, time, encoding modes, TV/Video channel information, recording durations, recording reservation information, and etc. In one embodiment of the invention, a menu "select" button (423) is used to navigate menus and/or enter desired menu choices based on a user selection. In addition, menu assistance buttons (e.g. a "−" button (419), a "+" button (425)) can also be used for navigation of menus supplied by an embedded software of the set-top box (401). In one embodiment of the invention, a plurality of I/O ports (e.g. 415, 417) are attached to the apparatus (e.g. set-top box (401)). In a preferred embodiment of the invention, the plurality of I/O ports are a USB-compliant port (e.g. 415, 417) and an SD-card port configured to accept an SD card (421). Other possible types of I/O ports include, but are not limited to, a FireWire port, an HDMI port, a Micro SD port, and an optical data transmission port.

Continuing with FIG. 4, in the preferred embodiment of the invention, the incoming stream of multimedia data signals (405A) is in analog domain which is first converted into a pre-encoded stream of digitized data by an analog-to-digital converter (ADC) in the apparatus (e.g. set-top box (401)). Then, the pre-encoded stream of digitized data is further converted into an encoded stream of a standard multimedia encoding format, such as H.264, WMV, or DivX. In the preferred embodiment of the invention, the set-top box (401) may dynamically gather some information from an external device (e.g. an SD card (421) or a USB-compliant device (e.g. 407, 427, or 429) connected to a USB port (e.g. 415, 417) to adjust a sampling rate for encoding the pre-encoded stream into a standard multimedia encoding format before an encoded stream is transmitted to the external device. In the preferred embodiment of the invention, the information gathered from the external device may be a remaining storage space in the external device (e.g. 407, 427, or 429).

In one example of the preferred embodiment of the invention, the set-top box (401) has an "adaptive encoding" mode which continuously monitors the remaining storage space of the external device (e.g. 407, 427, or 429). In the "adaptive encoding" mode, the set-top box (401) may or may not know a desired end time of recording by a user. If the desired end time of recording is known at the time of recording command (e.g. pressing a "Record" button (409)), then the set-top box (401) can simply calculate the amount of storage space required in the external device to transfer all streams of relevant multimedia data. If the set-top box (401) determines that the external device has sufficient storage space even for a highest-quality sampling rate (e.g. an SP-mode) which is compatible with the external device, then the set-top box (401) may begin processing and transfer of the multimedia data to the external device at the highest-quality sampling rate. On the other hand, if the set-top box (401) determines that the external device has only sufficient storage for a lower-quality sampling rate (e.g. an LP-mode or an EP-mode) for a standard multimedia encoding format, then the lower-quality sampling rate may be automatically used for encoding streams of the multimedia data for space-fitting transfer of the multimedia data to the external device.

In contrast, if the set-top box (401) does not know a desired end time of recording by the user because the user never specified the end time of multimedia data transfer to an external device, then the set-top box (401) can encode and transmit streams of multimedia data at a highest-possible-quality sampling rate (e.g. an SP-mode) until a threshold value for low available storage space is reached from the external device. Once the threshold value for low storage space is reached, the set-top box (401) can encode a subsequent stream of the multimedia data at a lower-quality sampling rate (e.g. an LP-mode or an EP-mode) to "cram-in" as many subsequent streams of multimedia data as possible until the low available storage space for the external device is completely consumed or until the user commands the apparatus to stop transmission of the multimedia data.

Figure 5:
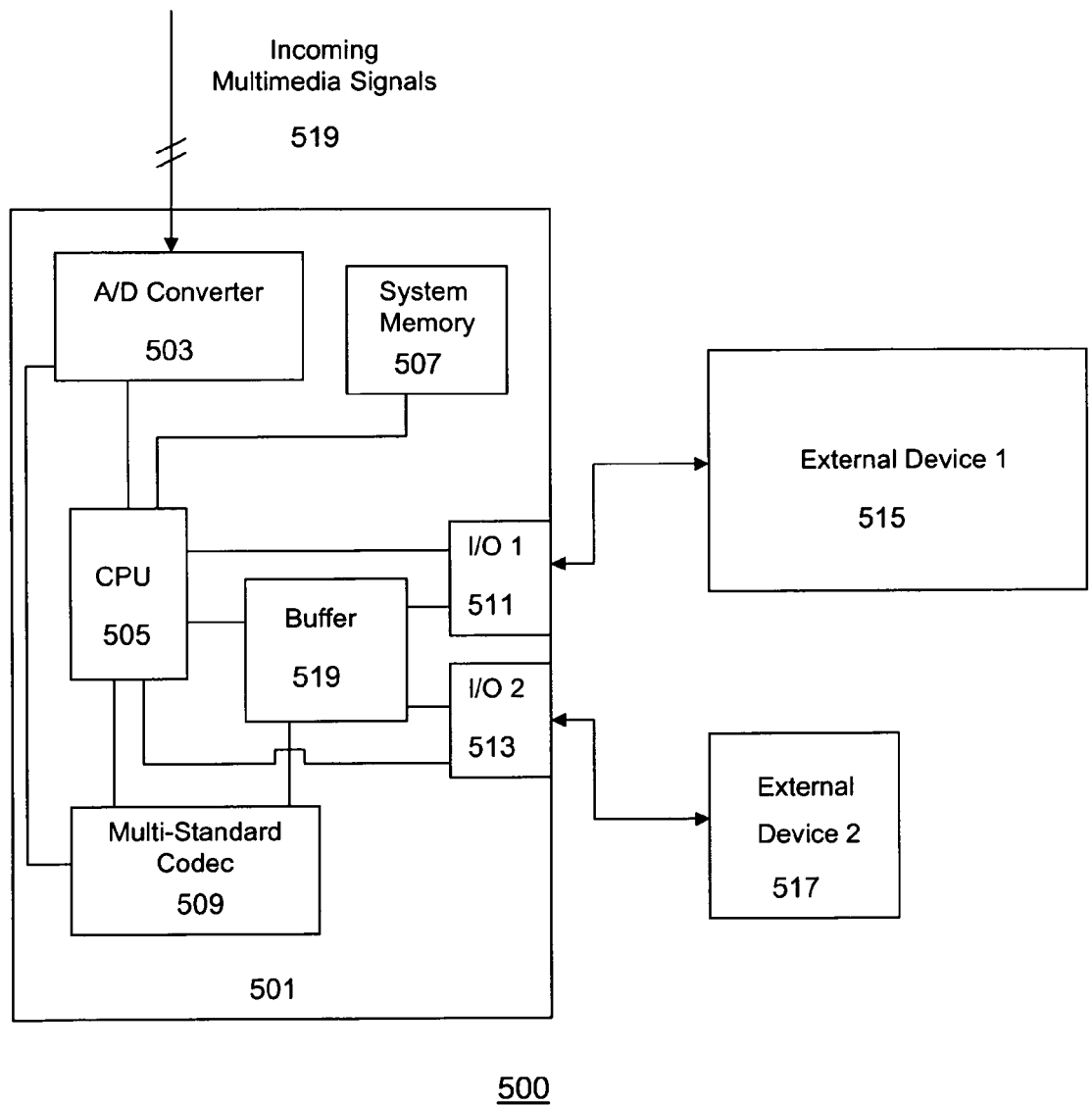
FIG. 5 shows a block diagram for an apparatus capable of intelligent analysis of device compatibility and adaptive processing of multimedia data in accordance with an embodiment of the invention.

FIG. 5 shows a high-level lock diagram (500) for an apparatus (501) capable of intelligent analysis of device compatibility and adaptive processing of multimedia data in accordance with an embodiment of the invention. In a preferred embodiment of the invention, the apparatus (501) comprises an analog-to-digital converter (ADC) unit (503), which is configured to receive and convert an incoming stream of multimedia data signals (519) to a pre-encoded stream of digitized data. In one embodiment of the invention, the incoming stream of multimedia data signals (519) is provided by a TV cable box, a satellite dish, or a video camera.

In the preferred embodiment of the invention, the apparatus (501) further comprises a codec unit (509), which is configured to encode the pre-encoded stream of digitized data from the ADC (503) to an encoded stream of a standard multimedia encoding format. In one embodiment of the invention, the standard multimedia encoding format may be H.264, WMV, DivX, or MP3. In the preferred embodiment of the invention, the codec unit (509) is capable of handling a multiple number of multimedia encoding formats, which may include H.264, WMV, DivX, and MP3. Furthermore, the codec unit (509) is capable of generating the encoded stream of a standard multimedia encoding format for a particular native display resolution of an external device. For example, an encoded stream of a standard multimedia encoding format for an SVGA-screen external device may involve different signal transformations and processing compared to those needed for a QVGA-screen external device. The apparatus (501) in Figure is able to detect different native display resolutions of external devices automatically by using an intelligent analysis of device compatibility in accordance with the present invention, even when no device driver information of external devices are available to the apparatus (501).

Continuing with FIG. 5, the apparatus (501) further comprises a buffer memory unit (519) which is configured to store the encoded stream of the standard multimedia encoding format prior to transmission to an external device (e.g. 515, 517). Moreover, the apparatus (501) also typically includes a system memory unit (507) to store operating instructions and/or data for the apparatus (501), a central processing unit (CPU) (505), and one or more I/O units (e.g. 511, 513). In one embodiment of the invention, the CPU (505) is operatively connected to the ADC unit (503), the codec unit (509), the system memory unit (507), the buffer unit (519), and the I/O units (511, 513). The CPU (505) is capable of executing the intelligent analysis of device compatibility as well as adaptive processing of multimedia data based on a remaining storage space of an external device (e.g. 515, 517).

Figure 6:
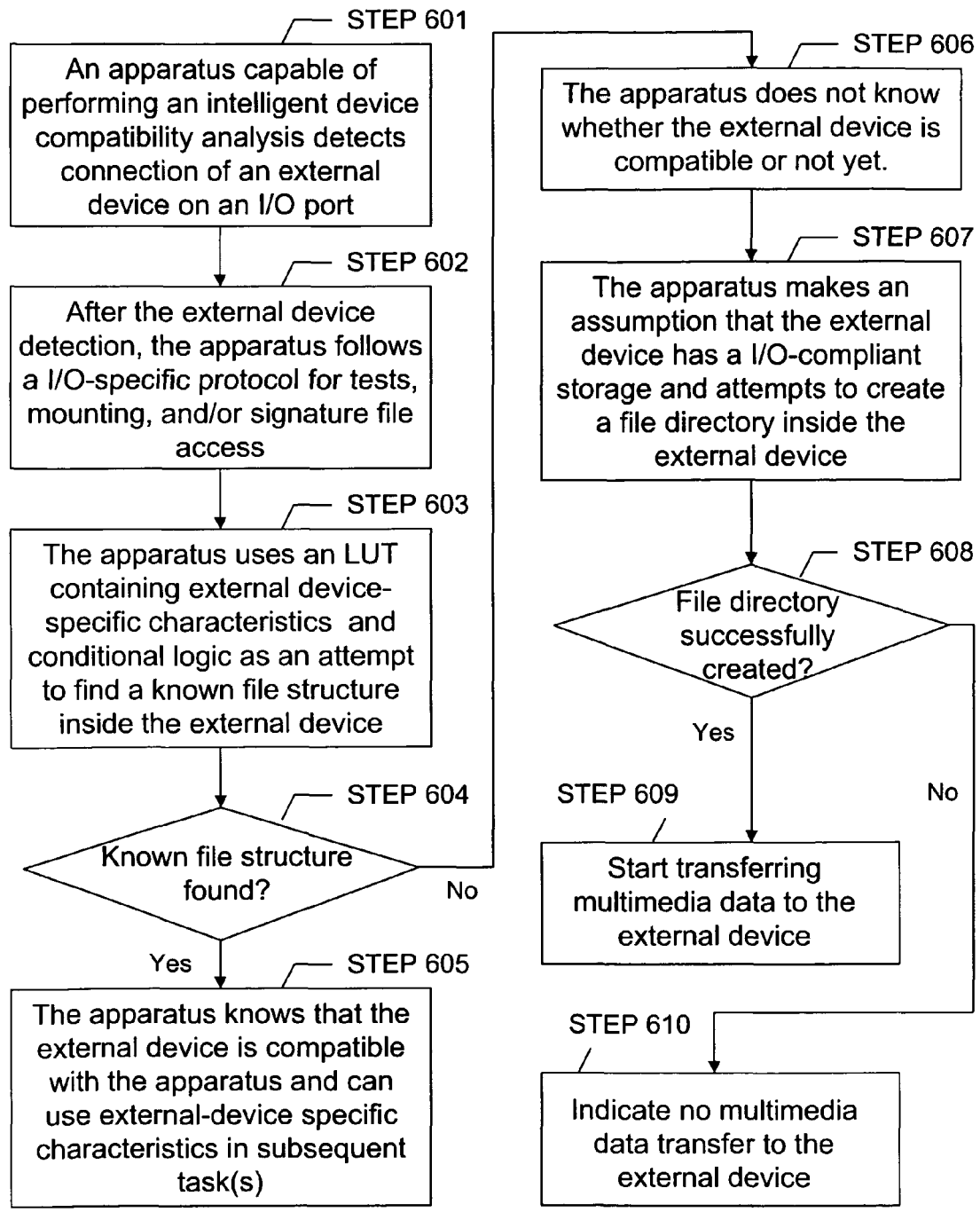
FIG. 6 shows a method for intelligent analysis of device compatibility in accordance with an embodiment of the invention.

FIG. 6 shows a method for intelligent analysis of device compatibility in accordance with an embodiment of the invention. In a preferred embodiment of the invention, the apparatus capable of performing an intelligent device compatibility analysis detects an operative connection of an external device to an I/O port, as shown in STEP 601. The operative "connection" of the external device can be either be a physical connection or a wireless (e.g. radio frequency-based). In one example, the detection of operative connection is accomplished by checking voltage levels of one or more pins inside the I/O port. In another example, the detection of operative connection is accomplished by an initial wireless communication attempt between the I/O port and the apparatus. Then, the apparatus executes or attempts to execute an I/O-specific protocol for tests, mounting, and/or signature file access from the apparatus to the external device, as shown in STEP 602. In one example, the I/O-specific protocol for tests, mounting, and/or signature file access can be based on USB-standard specifications. In another example, the I/O-specific protocol for tests, mounting, and/or signature file access can be based on FireWire-standard specifications. Yet in another example, the I/O-specific protocol for tests, mounting, and/or signature file access can be based on Wi-LAN or IEEE 802.11 specifications.

Once the external device and the apparatus goes through their I/O-specific test, mounting, and signature file access procedures, the apparatus uses a look-up table (LUT) containing external device-specific characteristics and conditional logic as an attempt to find a known file structure inside the external device, as shown in STEP 603. The use of the LUT does not need to involve device driver information for the external device, because the apparatus will attempt to determine a particular model and type of the external device by making educated guesses (i.e. using conditional logic) via if-then and/or if-then-else statements in its attempt to find a known file structure inside the external device. In one embodiment of the invention, the educated guesses using the conditional logic includes parsing serial numbers and/or model names of the external device even when the device driver for the external device is unavailable.

In a preferred embodiment of the invention, the LUT for external device-specific characteristics and conditional logic contained inside the apparatus (e.g. 201) includes information related to compatible data sampling rates (e.g. EP, LP, SP), multimedia codec types (e.g. H.264, WMV, DivX, MP3), and native display resolutions (e.g. QVGA, VGA, SVGA, XGA) for numerous kinds of external devices which may be potentially be connected to the apparatus. It is important to note that the external device-specific characteristics in the LUT are not typically provided by device drivers of external devices. In a typical embodiment of the invention, many external devices may not ever supply device drivers to the apparatus, because the external device manufacturers may not be aware of the apparatus or simply did not provide an explicit compatibility solution for the apparatus. A unique aspect of the present invention for intelligent analysis of device compatibility is that the LUT is typically pre-stored inside the apparatus and comprises of information which are publicly available through user manuals or specifications of common external devices. In a preferred embodiment of the invention, the LUT is periodically updated by a distributor and/or manufacturer of the apparatus.

Continuing with FIG. 6, in a preferred embodiment of the invention, the apparatus determines whether a known file structure is found inside the external device, as shown in STEP 604. If the known file structure is found inside the external device, then the apparatus has identified essential external device-specific characteristics such as compatible data sampling rates (e.g. EP, LP, SP), compatible multimedia codec types (e.g. H.264, WMV, DivX, MP3), and desired native display resolutions (e.g. QVGA, VGA, SVGA, XGA) specifically for the external device from its LUT entries, as shown in STEP 605.

On the other hand, if the known file structure is not found inside the external device, then the apparatus does not yet know whether the external device is compatible with the apparatus or not, as shown in STEP 606. In a preferred embodiment of the invention, a failure to identify the known file structure inside the external device will prompt the apparatus to make an assumption that the external device has an I/O-compliant storage space (e.g. a USB-compliant storage space). Then, the apparatus will attempt to create a file directory inside the external device, as shown in STEP 607, and then make a determination whether the file directory is successfully created inside the external device or not, as shown in STEP 608. If the file directory is successfully created, then the apparatus can at least transfer some multimedia data to the external device based on a user command to the apparatus using one or more command buttons, as shown in STEP 609. In contrast, if the file directory is not successfully created inside the external device, then the apparatus can indicate that the apparatus and the external devices are fatally incompatible using an embedded display, an externally-connected display panel, and/or an attached speaker, as shown in STEP 610.

FIG. 7 shows an example of a look-up table (700), also known as an LUT, containing external device-specific characteristics in accordance with an embodiment of the invention. In one embodiment of the invention, the LUT (700) includes compatible data sampling rates (e.g. EP, LP, SP), compatible multimedia codec types (e.g. H.264, WMV, DivX, MP3), and native display resolutions (e.g. XGA, SVGA, QVGA) of one or more external devices (e.g. Device A~D). In one embodiment of the invention, the LUT (700) also includes a "default" entry (e.g. "Default USB storage"), which uses presumed parameters for a file directory creation attempt in an external device if the apparatus could not find a known file structure inside the external device based on other LUT (700) entries and conditional logic.

FIG. 8 shows an example (800) of multimedia data sampling mode types and rates in accordance with an embodiment of the invention. In one embodiment of the invention, a "standard play mode", also known as an "SP" mode, is a high-quality data sampling mode with a sampling rate of 2 megabits per second. This means that the SP mode requires a large amount of storage space relative to lower-quality data sampling modes. For example, a "long play mode", also known as an "LP" mode, is a medium-quality data sampling mode with a sampling rate of 1 megabits per second. The LP mode consumes less storage space because the sampling rate of multimedia data is lower compared to the sampling rate of the multimedia data in the SP mode. However, the lower sampling rate of the LP mode may compromise the playback quality of the multimedia data compared to the SP mode. Similarly, an "extended play mode", also known as an "EP" mode, is a low-quality data sampling mode with a sampling rate of 0.5 megabits per second. Although the EP mode consumes less storage space even compared to the LP mode, the degradation in the playback quality of the multimedia data compared to the SP mode and the LP mode may be significant due to a significantly-lower data sampling rate. In a preferred embodiment of the invention, the multimedia data sampling mode types also include an "adaptive encoding rate" mode which varies the data sampling rate of the multimedia data based on a remaining storage space in an external device, as described previously.

Figure 9:
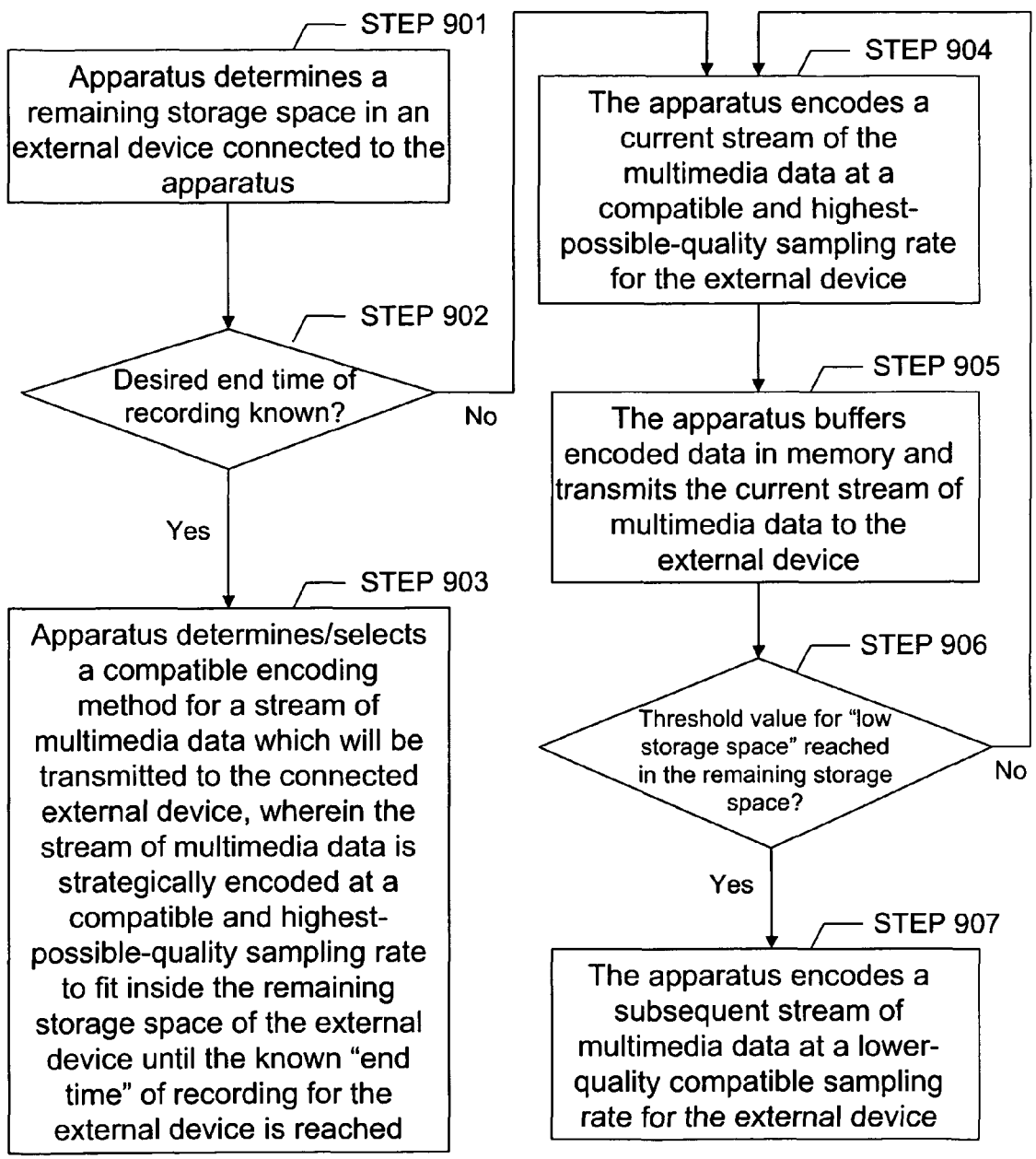
FIG. 9 shows a method of intelligent analysis for adaptive processing of multimedia data in accordance with an embodiment of the invention.

FIG. 9 shows a method of intelligent analysis for adaptive processing of multimedia data in accordance with an embodiment of the invention. In STEP 901, an apparatus capable of performing the intelligent analysis for adaptive processing of multimedia data analyzes a remaining storage space in an external device operatively connected to the apparatus. In a preferred embodiment of the invention, the apparatus has an "adaptive encoding" mode which continuously monitors the remaining storage space of the external device, if the adaptive encoding mode is enabled. In the adaptive encoding mode, the apparatus may or may not know a desired end time of recording by a user at the beginning of any data transmission to the external device, as shown in STEP 902. If the desired end time of recording is known at the time of recording command (e.g. pressing a "Record" button), then the apparatus can simply calculate the amount of storage space required in the external device to transfer all streams of relevant multimedia data, as shown in STEP 903. Furthermore, if the apparatus determines that the external device has sufficient storage space even for a highest-quality sampling rate (e.g. an SP-mode) which is compatible with the external device, then the apparatus may begin processing and transfer of the multimedia data to the external device at the highest-quality sampling rate, as also shown in STEP 903. On the other hand, if the apparatus determines that the external device has only sufficient storage for a lower-quality sampling rate (e.g. an LP-mode or an EP-mode) for a standard multimedia encoding format, then the lower-quality sampling rate may be automatically used for encoding streams of the multimedia data for space-fitting transfer of the multimedia data to the external device, as indicated by the wording "highest-possible-quality sampling rate" in STEP 903.

In contrast, if the apparatus does not know a desired end time of recording by the user because the user never specified the end time of multimedia data transfer to an external device, then the apparatus can encode and transmit streams of multimedia data at a highest-possible-quality sampling rate (e.g. an SP-mode), as shown in STEP 904, and typically buffers the encoded data in memory and transmits a current stream of multimedia data to the external device, as shown in STEP 905. Then, if a threshold value for low available storage space is reached in the external device, as shown in STEP 906, the apparatus can encode a subsequent stream of the multimedia data at a lower-quality sampling rate (e.g. an LP-mode or an EP-mode) to "cram-in" as many subsequent streams of multimedia data as possible until the low available storage space for the external device is completely consumed or until the user commands the apparatus to stop transmission of the multimedia data.

The present invention provides several advantages to conventional means of achieving device compatibility and processing multimedia information between electronic devices. One advantage is that the intelligent analysis of device compatibility, as disclosed in the present invention, does not require device drivers to provide a seamless compatibility recognition between electronic devices. Another advantage is robustness and resilience of the unique intelligent analysis performed for device compatibility in the present invention. By utilizing a look-up table containing external device-specific characteristics and conditional logic, an apparatus first attempts to find a recognizable file structure inside an external device. If the attempt to find a recognizable file structure fails, then the apparatus makes an additional effort to bring at least some level of compatibility with the external device by attempting to simply create a file directory in the external device (i.e. by making an assumption that the external device has at least some I/O-compliant storage capacity), even if they may not be fully compatible. In many practical applications of device connections and data transmissions, the present invention provides a higher level of robustness and resilience in search of at least some device compatibility, compared to a conventional method of indicating device incompatibility when an apparatus recognizes a lack of access to device drivers or encounters incompatible data structures inside the external device.

Another advantage of the invention is a flexibility of data storage management provided by the intelligent analysis of adaptive processing of multimedia data. For example, when an apparatus is in an adaptive encoding mode, the apparatus can dynamically monitor a remaining storage space in an external device and optimize multimedia data encoding techniques (e.g. changing sampling rates depending on the remaining storage space in the external device) to achieve an effective data storage management.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for conducting an intelligent analysis of device compatibility by an apparatus, the method comprising the steps of:
    detecting an operative connection of an external device to an I/O port of the apparatus capable of performing the intelligent analysis of device compatibility;
    executing or attempting to execute an I/O-specific protocol for tests, mounting, and/or signature file access from the apparatus to the external device;
    using a look-up table (LUT) containing external device-specific characteristics and conditional logic as an attempt to find a known file structure inside the external device; and
    if the known file structure is not found inside the external device:
        making an assumption that the external device has an I/O-compliant storage; and
        attempting to create a file directory inside the external device;
        if the file directory is successfully created:

transferring at least some multimedia data to the external device;

else if the file directory is not successfully created:

indicating that the apparatus and the external device are not compatible.

2. The method of claim 1, further comprising a step of performing a desired communication between the apparatus and the external device if the known file structure is found inside the external device.

3. The method of claim 1, wherein the external device-specific characteristics in the LUT include compatible data sampling rates between the apparatus and a plurality of external devices, compatible codec types for the plurality of external devices, and ideal native display resolutions for the plurality of external devices.

4. The method of claim 1, wherein the step of using the LUT includes identifying and/or parsing device serial numbers and/or model names of the external device based on external device-specific characteristics and/or the conditional logic, even when a device driver for the external device is unavailable.

5. The method of claim 3, wherein the compatible codec types for the plurality of external devices include H.264, WMV, and/or DivX.

6. The method of claim 3, wherein the compatible codec types have data sampling rate types of standard play (SP) mode, long play (LP) mode, extended play (EP) mode, and/or adaptive encoding (i.e. data sampling) rates.

7. The method of claim 1, wherein the I/O port is a USB-compliant port, a SD-compliant port, or a FireWire-compliant-port.

8. The method of claim 1, wherein the operative connection of the external device to the I/O port of the apparatus is either wired or wireless.

* * * * *